Feb. 3, 1953  H. M. SHERIDAN  2,627,106
TOOL BIT

Filed Jan. 3, 1946  4 Sheets-Sheet 1

INVENTOR.
Henry M. Sheridan
BY
F. T. Sperry
ATTORNEY.

Feb. 3, 1953     H. M. SHERIDAN     2,627,106
TOOL BIT

Filed Jan. 3, 1946     4 Sheets-Sheet 2

Inventor
HENRY M. SHERIDAN

By Albert Sperry.
Attorney

Feb. 3, 1953 H. M. SHERIDAN 2,627,106
TOOL BIT
Filed Jan. 3, 1946 4 Sheets-Sheet 3

INVENTOR.
Henry M Sheridan
BY
H. T. Spiery
ATTORNEY.

Feb. 3, 1953          H. M. SHERIDAN          2,627,106

TOOL BIT

Filed Jan. 3, 1946          4 Sheets—Sheet 4

INVENTOR.
Henry M Sheridan
BY
ATTORNEY

Patented Feb. 3, 1953

2,627,106

UNITED STATES PATENT OFFICE 2,627,106

TOOL BIT

Henry M. Sheridan, Erie, Pa., assignor to Apex Tool & Cutter Company, Shelton, Conn., a corporation of Connecticut Application January 3, 1946, Serial No. 638,741

2 Claims. (Cl. 29—95)

This invention relates to tool bits and is particularly concerned with bits for the cutting tools of machine tools.

While the cutting instrument of machine tools are at times solid bodies having a cutting edge formed thereon and an integral shank which is bolted or otherwise secured to a tool post, head or turret of the machine whereby it is fed towards the work piece, many such instrument are of composite construction and include a tool holder including the shank to be secured to the feeding device and a separate removable and replaceable bit which is in turn secured to the tool holder and which is formed with a cutting edge which performs the actual machining operation. To the latter type of structure the present invention is directed.

Many various types of tool holders for rigidly securing a tool bit have been designed, patented and successfully used.

A paramount objective in all tool bit holders is the rigid retention of the bit with the holder. Obviously such bits are subjected to tremendous forces when applied to swiftly moving tempered steel work pieces. Obviously, also, any slight ability for play or vibration of the bit with respect to the holder will result in incalculable difficulties. Expensive bits may be runed, work pieces spoiled and disastrous loads may be imposed upon the machine tool structure itself.

At least one of the objects sought to be obtained by every tool holder design is this rigidity of securement of the bit. The problem is quite complicated due to the fact that the cutting strains are so varied in force and direction and result from such differences in cause that the designer is frequently found to over-compensate for one type of force while not providing adequate support and locking strength for a different force or a resultant force which responds to two or more directly applied forces.

In most tool holder and bit combinations the tool bit has been a simple parallelogram of tool steel with a cutting edge formed thereon or with a carbide tungsten or like cutting tip applied thereto. In such holders the securement of the bit is a problem of the holder exclusively, the bit being in no way formed to cooperate with the holder to so direct the cutting strains as to assist in their most efficient dispersion throughout the mass of the holder.

The objects of the present invention include that of providing a bit and holder assembly of new and improved design which will provide maximum of bit securement and rigidity between holder and bit while maintaining a simplicity of structure and design well suited to economic manufacture.

This general objective is fulfilled by the achievement of other objectives as for instance, the provision of a bit so designed that the components of various cutting forces have resultants which back up into substantial masses of the holder body so as to avoid localized strains and points of impossible stress.

More particularly it is among the objects of the invention to provide means in the form of correlated angularities by which applied forces merge and/or cancel out to the end that the tendency for loosening of the bit in the holder is reduced to a minimum and the strength and mass of the holder is utilized to its maximum.

These and other objectives of the inventive concept have been achieved by a scientific analysis of the various forces to which the bit and holder are subjected during the cutting action and a careful design by which applied forces are directed and regimented into force vectors which lend themselves to the full utility of the available strength of the holder body.

Further analysis of the assemby and its force directing and marshalling characteristics may be had from a consideration of the following specification when taken in conjunction with the accompanying drawings, in which.

Figure 1:
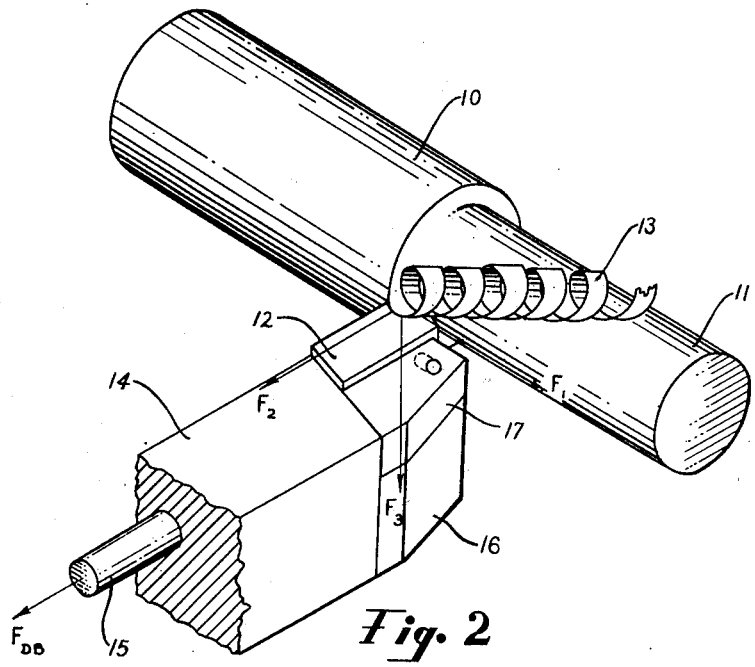
Fig. 1 is a perspective view of the tool bit and holder during cutting operation.

In Fig. 1 of the drawings the numeral 10 represents a work piece being turned by securement to a rotating work holding chuck, a simple latheing operation being performed to reduce the external diameter of the piece to that shown at the end portion 11. The tool bit in this figure and throughout the drawings is identified generally by the numeral 12. The chip being removed by application of the cutting edge of the bit to the rotating work is identified by the numeral 13. The body of the tool holder is indicated by the numeral 14 while the shank of a draw bar is indicated by the numeral 15.

The tool holder here shown as by way of example is provided with a forwardly projecting bit seat 16 upon which is mounted a bit clamp 17 mounted on serrations 18 and adapted to be secured in transversely adjusted position by a securing stud 19.

Figure 1A:
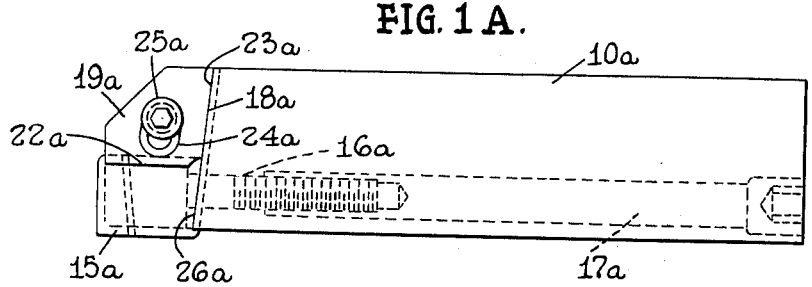
Figure 1(A) is a top plan view of a tool bit and holder similar to that shown in Figure 1.
Figure 1B:
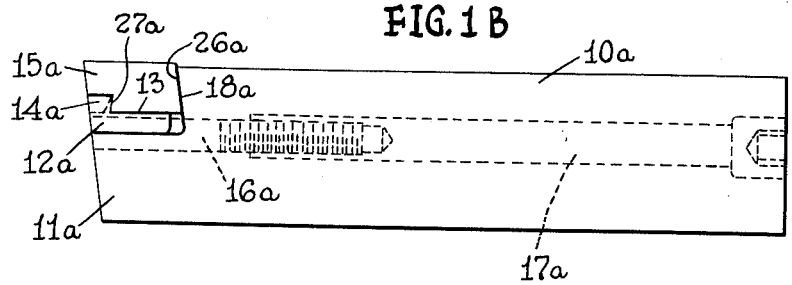
Figure 1(B) is a side elevation of the bit and holder of Figure 1(A)
Figure 1C:
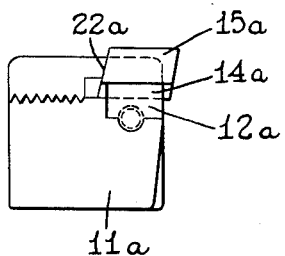
Figure 1(C) is an end elevation thereof.

A similar tool bit and tool holder assembly is disclosed in Figures 1(A), 1(B) and 1(C), in which the holder is illustrated as comprising a body 10a which may be of elongated rectangular configuration as here shown, or may be angularly disposed with respect to its head 11a or otherwise arranged for mounting advantageously within a machine tool. The head 11a which is here shown as merely the extended left end of the body 10a, is provided with an adjustable tool seat 12a including a bit table 13a which is formed by a plain transverse surface below the top surface of the body and having a vertically and transversely inclined bit engaging shoulder 14a. If desired the table 13a may be provided with serrations with which like serrations of tool bit 15a may cooperate. The tool seat 12a is mounted for rectilinear adjustment on the head 11a by virtue of a threaded shank 16a which extends into the body 10a and engages a draw bolt 17a which may be conveniently actuated from the rear of the holder. Thus the seat may be moved towards and from a vertically and transversely inclined end wall 18a of the body.

For assisting the tool seat 12a in rigidly securing the bit 15a fixedly with respect to the head 11a, a clamp 19a is provided, the upper surface of which may advantageously be parallel to the upper surface of the body 10a. The under surface of the clamp 19a is preferably cut away to provide a clearance with the lower inner side edge of the bit 15a. The remainder of the under surface rests upon a side platform adjacent to the surface 13a, these surfaces being preferably serrated as shown in Figures 1(A) and 1(B). The inner longitudinal bit contacting wall 22a of the clamp 19a is vertically inclined to lie over and engage the oppositely inclined side wall of the bit 15a, while the transverse end or body contacting surface 23a of the clamp is both transversely and vertically inclined to conform with the inclination of the wall 18a. The clamp 19a is provided with an elongated and inclined slot 24a which receives therethrough a securing bolt 25a. The inclination is such as to permit simultaneous transverse and longitudinal movement of the clamp so that it may be adjusted along the surface 18a.

The bit 15a is provided with an inner end surface 26a which is vertically and transversely inclined in conformity to the inclination of the wall 18a and is further provided with an inclined shoulder 27a which conforms to the combined vertical and transverse inclinations of the portion 14a of the bit seat.

From this construction, it will be seen that the inward thrust by the shoulder 14a will have both a longitudinal and transverse component thus urging the bit against the clamp surface as well as against the surface 18a while both the surfaces 18a and 22a will hold the bit down upon the surface 13a. Thus it will be seen that the various inclinations of the elements combine and cooperate to bring about rigid and vibrationless locking of the bit in the holder, as hereinafter more fully disclosed.

As hereinbefore indicated the objects of the invention included the solving of the following problems:

First to provide a bit and/or bit and holder assembly in which every cutting force and all components of these forces react to push the tool bit more solidly into its holding pockets and to provide for the reactance of forces and force components against solid walls so that the tool bit and holder become a rigid body, and Second to provide an assembly in which the holding forces exerted on the bit by the body also acted to force the bit against solid walls to assist in providing a rigid assembly.

Figure 2:
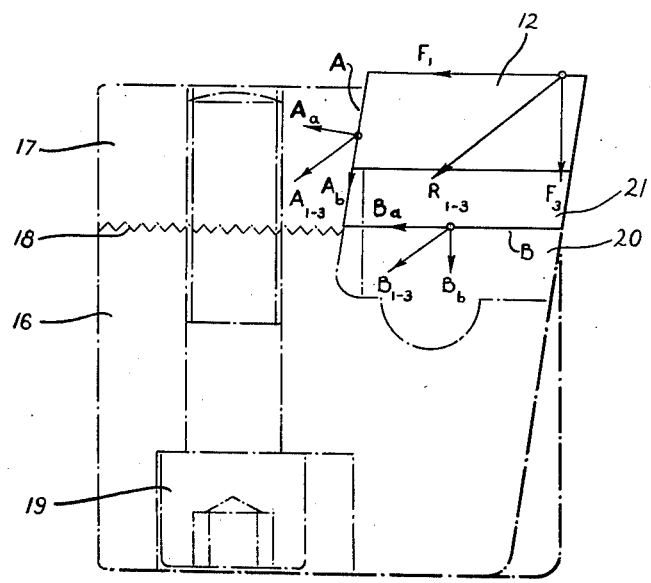
Fig. 2 is an end elevation with diagrammatic illustration of the cutting forces in a vertical transverse plane.
Figure 3:
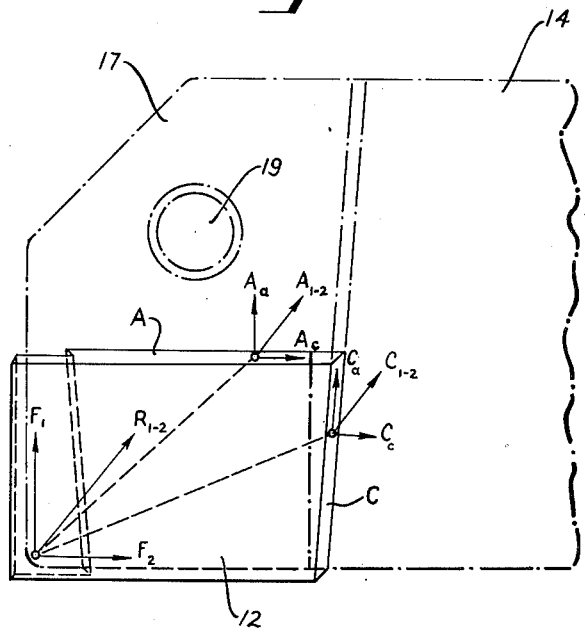
Fig. 3 is a top plan view with diagrammatic illustration of the cutting forces in a horizontal plane.
Figure 4:
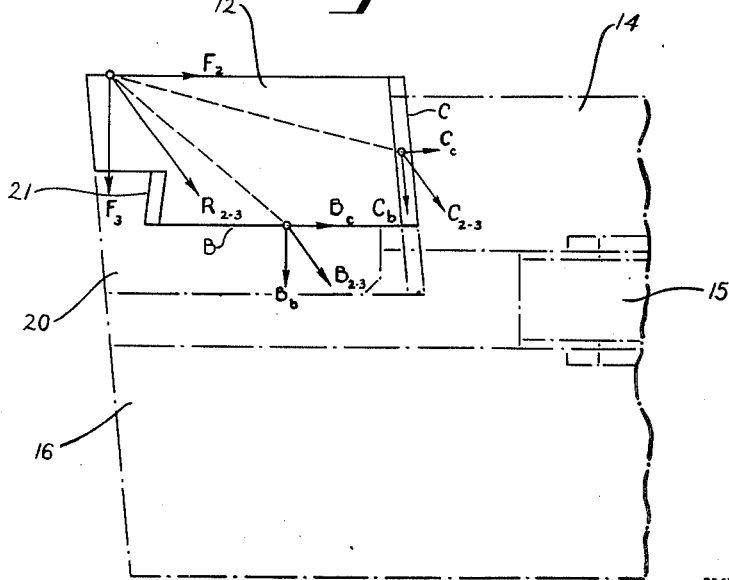
Fig. 4 is a side elevation with diagrammatic illustration of the cutting forces acting in a vertical axial plane.

To that end the accompanying Figures 2, 3 and 4 diagrammatically show by force vectors that every cutting force and all components of these forces are reacting to push the tool bit more solidly into its holding pocket and that all force components are reacting against a solid wall of the holder thereby making the tool bit and the tool holder a rigid body.

Figure 5:
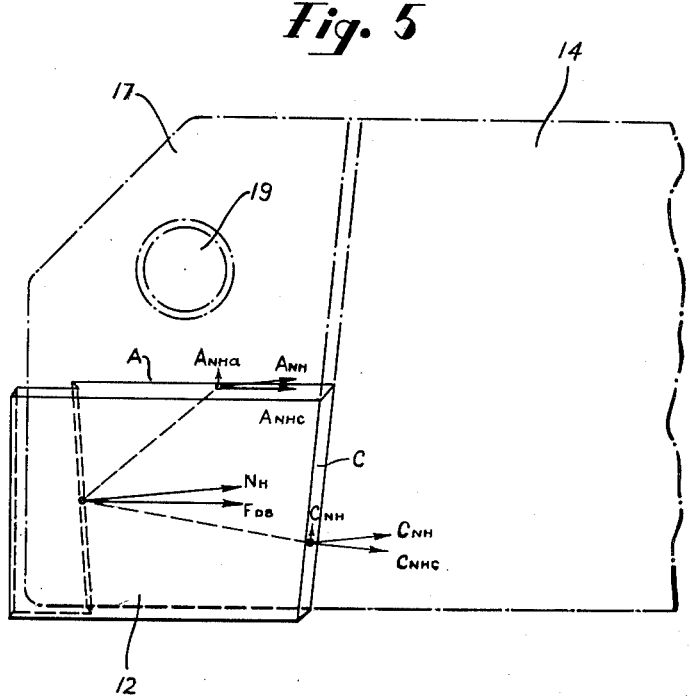
Fig. 5 is a view similar to Fig. 3, but diagrammatically illustrating the draw bar forces applied by the holder to the bit in a horizontal plane.
Figure 6:
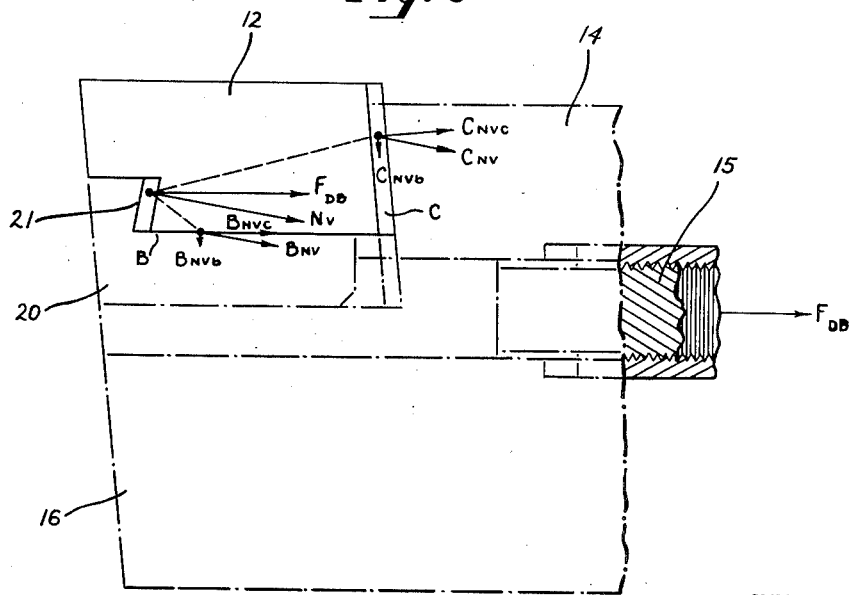
Fig. 6 is a view similar to Fig. 4 diagrammatically illustrating the draw bar forces acting on the bit in a vertical axial plane.

Figures 5 and 6 show diagrammatically by force vectors that the holding force of the draw bar is also forcing the tool bit against the solid walls of the holder, tending also toward a rigid body construction.

The primary cutting forces exerted upon a tool bit when applied to a cutting action as indicated in Fig. 1 are as follows:

A.—Feed force—which is a force stress acting transversely of the bit and produced by the axial feed of the bit along the work. In the drawings this force is shown as F1.

B.—Radial force—a pure radial force with respect to the work piece axis producing a force stress axially of the holder and indicated in the diagrams by F2.

C.—Chip force—a tangential force with respect to the work and acting as a vertical force downwardly upon the top of the tool bit.

Figs. 5 and 6 analyze the draw bar forces which regardless of cutting action exert forces on the bit.

Throughout the following discussion it will be understood that since the holder and bit are secured together as a rigid and unitary body the forces acting do not produce movement and thus the vector lines represent stresses and tendencies towards movement rather than any actual movement of the bit with respect to the holder during cutting. The draw bar forces, however, do act to initially seat the bit and such forces, vectors and components may produce initial seating movement. Numeral 20 represents the head of the draw bar whose shank is shown at 15. The head forms the tool seat and is provided with a bit engaging angularly faced shoulder 21.

While the tool bit 12 of the present invention is substantially a parallelogram its side wall A and its rear wall C are inclined. The inclination of the inner side wall A is an inward inclination from top to bottom so that its bottom edge lies further inwardly of the holder body than its inner top edge. There is, however, preferably no inclination of the plane of the inner edge A with respect to the longitudinal axis of the holder. While the opposite outer longitudinal edge of the bit may be parallel with the inner longitudinal edge A as shown this is not required and since this outer longitudinal edge may perform cutting functions it may well have a plane quite dissimilar from that of the edge A.

The inner edge C of the bit 12 is also angularly disposed. In this case, however, the angularity is with respect to both of the transverse planes. In other words the edge tapers rearwardly from the side and rearwardly so that while the contacting wall of the holder in contact therewith overlies the rear edge C the inner portion of the rear wall extends further in an axial direction into the holder shank.

In the present and preferred form of the invention the bit is retained in the holder by the draw bar head 20, the shoulder 21 of which engages an undercut recess of the bit. It will be understood, of course, that the bit may be otherwise secured as by a head secured by a locking screw and if desired the shoulder may engage the front face of the bit instead of in an undercut.

The contacting face of the shoulder 21 and the cooperating face of the undercut are inclined both vertically and transversely in opposite direction from the inclination of the edge C so that as between these surfaces the bit is wedge shaped both longitudinally and horizontally.

In the drawings the degree of angularity from the normal of the inclined surfaces is in the nature of 10°, however, it will be understood that the specific degree of any angularity is subject to modification over a wide range and the invention is not limited to any specific angularity of a surface in either transverse or longitudinal direction. It will also be understood that while the specific combination of angularities here shown are deemed preferable there may be instances where certain of such inclinations may be modified or omitted without departure from the present inventive concept.

Referring now particularly to Fig. 2, the cutting forces acting in a vertical transverse plane are depicted by the arrows F1 and F3. The force F1 acts transversely of the holder and is caused by a combination of the feed movement of the bit axially of the work and by the drag of the chip across the bit surface. The force F3 is a straight downward force caused by the chip which is being forced away from the work surface. The resultant of these forces is indicated by the arrow R1-3 and this resultant force is received jointly by the surface A and the bit seating surface B. The force acting on the surface A due to the angularity of that surface is properly divided into components $Aa$ and $Ab$ which result in a resultant A1-3 which it will be noted is in a direction inwardly and downwardly toward the main mass of the holder.

Similarly the forces acting on the horizontal surface B include a transverse component $Ba$ and a downward vertical component $Bb$, the resultant of which is a force B1-3 acting parallel to the force A1-3 and is similarly in a direction toward the mass of the holder.

Referring now to Fig. 3 of the drawings, the cutting forces acting in a horizontal plane are indicated by the arrows F1 and F2, the force F1 as before stated being transverse of the holder and is caused by the feed movement and chip curl, the force F2 is in a longitudinal direction with respect to the holder and is also a cutting force resulting from the application of the cutting edge to the work. The resultant of these horizontal forces is indicated by the arrow R1-2.

The thrust of such forces is taken by the surfaces A and C. Since the surface A is longitudinally parallel with the axis of the holder, the components of the force R1-2 which acts thereagainst are right angularly related forces $Aa$ and $Ac$ which have as their resultant the force A1-2 which is in a direction back and into the mass of the holder.

The effect of the resultant R1-2 on the surface C is, by virtue of the transverse inclination of that surface, divided into force $Ca$ and $Cc$, the resultant of which is the force C1-2 which is an inwardly directed force parallel to the force A1-2.

The longitudinally vertical cutting forces are illustrated in Fig. 4 and comprise the longitudinal force F2 and the downwardly directed chip force F3 the resultant of which is the downwardly and inwardly directed force R2-3. The effect of the force R2-3 on the surface C is, by virtue of its vertical inclination, divided into the forces $Cc$ and $Cb$, the resultant of which is the force C2-3 which is downwardly and inwardly directed toward the mass of the holder.

The effect on the surface B of the resultant R2-3 is the right angularly directed vectors $Bc$ and $Bb$, the resultant of which is the force B2-3 which is an inwardly and downwardly directed force parallel to the force C2-3.

From the above consideration, it will be seen that by virtue of the inclinations of the co-related surfaces all of the resultant cutting forces are inwardly directed to the body of the holder and pure transverse forces in either vertical or horizontal direction are avoided and all the forces are diverted back into the body of the holder where its maximum strength and the greatest securement is maintained.

As hereinbefore pointed out, the bit 12 is positioned and retained in the holder by the doubly inclined surface 21 of the head 20 of the draw bar 15, the bit being undercut to provide a force receiving surface of matching double inclination. By reference to Figs. 5 and 6 it will be seen that the holding force ($Fdb$ see Figs. 1 and 6) applied by the draw bar 15 acts with the cutting forces to retain the assembly as an integral force transmitting body.

In Fig. 5 the longitudinal force $Fdb$ is shown as being transmitted as a horizontal force $Nh$ due to the transverse inclination of the surface 21. This normal horizontal force is transmitted to the surface A where it is resolved into components indicated by the arrows, $Anha$ being a plane transverse force, $Anh$ being a pure longitudinal force and $Anhc$ a force diverted by the inclination of the side A towards the surface C.

The force $Nh$ is taken by the surface C as indicated by the component vectors, $Cnha$ being a force parallel to the force $Anha$ and $Cnh$ parallel to $Anh$ while the inclination of the surface C provides for a further component $Cnhc$.

Fig. 6 shows the draw bar forces acting in a vertical plane. The vertical angularity of the surface 21 directs the force $Fdb$ into a force $Nv$ which is transmitted to the surface C as a force having the components $Cnvc$, $Cnv$ and $Cnvb$ while the force transmitted to the surface B is indicated by the component vectors $Bnvb$, $Bnv$ and $Bnvc$.

From a consideration of Figs. 5 and 6 it will be seen that the components of all the draw bar forces act as do the cutting force components in a direction inwardly towards the mass of the holder body so as to assist in perfecting the securement of the bit in a manner approaching the integral.

It will, of course, be understood that the invention may be carried out in many modifications of the structure here shown. The degree of angularity may be widely varied and in some instances the inclinations of some surfaces may be omitted. The inventive concept embraces all the possible permutations and combinations of suggested inclinations of the surfaces A, C and 21. Changes, modifications and variations thereof are not deemed to be a departure from the spirit and scope of the appended claims.

What I claim is:

1. A tool bit for use with a holder, said bit having two opposite sides faces, one of which is designed to engage a holder and the other of which is designed to be exposed when the tool bit is in use, and having an inner end face designed to engage a holder and an outer end face designed to be exposed when the tool bit is in use, said bit presenting a top chip engaging surface in the general form of a parallelogram defined by said faces, the inner end face and that side face of the tool bit which is designed to engage a holder being inclined with respect to said chip engaging surface and extending outward and downward therefrom, the opposite lower surface of the tool bit being designed to seat on a holder, the inner end of the tool bit being thicker than the outer end thereof and said lower surface having an outwardly facing clamping face thereon extending across the bit from one side face to the other and inclined inwardly and upwardly from the lower surface toward the chip engaging surface.

2. A tool bit for use with a holder, said bit having two opposite side faces, one of which is designed to engage a holder and the other of which is designed to be exposed when the tool bit is in use, and having an inner end face designed to engage a holder and an outer end face designed to be exposed when the tool bit is in use, said bit presenting a top chip engaging surface in the general form of a parallelogram defined by said faces, the inner end face and that side face of the tool bit which is designed to engage a holder being inclined with respect to said chip engaging surface and extending outward and downward therefrom, the opposite lower surface of the tool bit being designed to seat on a holder, the inner end of the tool bit being thicker than the outer end thereof and said lower surface having an outwardly facing clamping face thereon extending across the bit from one side face to the other and inclined inwardly and upwardly from the lower surface toward the chip engaging surface, said clamping face being inclined transversely of the bit so as to be spaced a lesser distance from the inner end face adjacent the exposed side face of the bit than at the opposite side face thereof.

HENRY M. SHERIDAN.

REFERENCES CITED

The following references are of record in the file of this patent:

UNITED STATES PATENTS

| Number | Name | Date |
|---|---|---|
| 1,720,820 | Cole | July 16, 1929 |
| 1,793,564 | Severson | Feb. 24, 1931 |
| 1,875,967 | Weddell | Sept. 6, 1932 |
| 2,140,941 | Reaney | Dec. 20, 1938 |
| 2,500,387 | Sheridan | Mar. 14, 1950 |

FOREIGN PATENTS

| Number | Country | Date |
|---|---|---|
| 609,757 | France | Aug. 24, 1926 |